June 17, 1958  H. B. JOHNSON  2,839,189
ELECTROSTATIC SEPARATION METHOD
Filed Feb. 1, 1954  4 Sheets-Sheet 1

INVENTOR.
HERBERT B. JOHNSON
HIS ATTORNEY

June 17, 1958     H. B. JOHNSON     2,839,189
ELECTROSTATIC SEPARATION METHOD

Filed Feb. 1, 1954     4 Sheets-Sheet 3

INVENTOR.
HERBERT B. JOHNSON
BY
HIS ATTORNEY

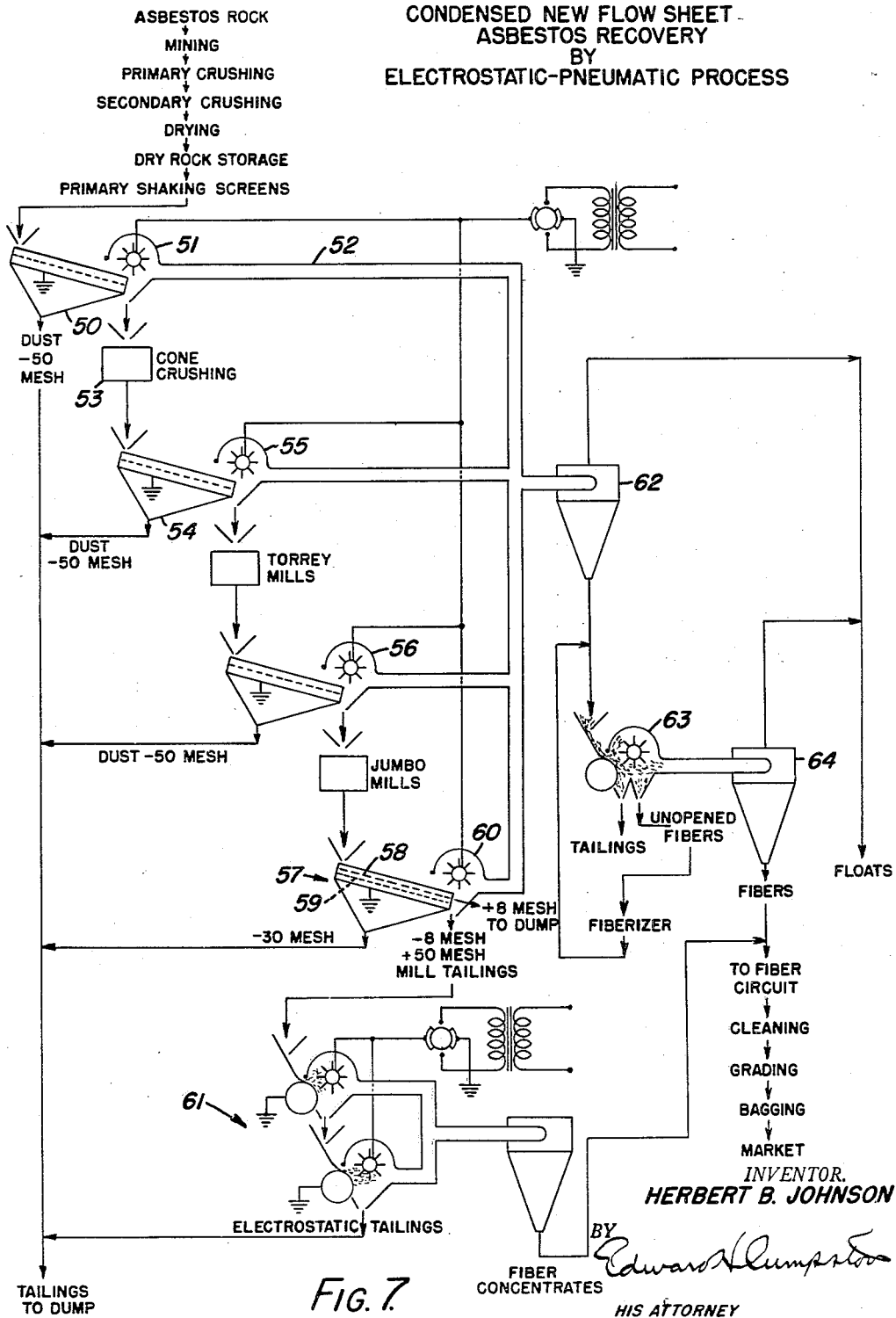

3,839,189
Patented June 17, 1958

2,839,189

ELECTROSTATIC SEPARATION METHOD

Herbert B. Johnson, Rochester, N. Y., assignor to The Quaker Oats Company, Chicago, Ill., a corporation of New Jersey Application February 1, 1954, Serial No. 407,275

7 Claims. (Cl. 209—127)

This invention relates to methods and apparatus for separating mixtures of materials, and more particularly to a combined electrostatic and pneumatic method of separation, concentration, and extraction of materials.

The problem of separating intimate mechanical mixtures of ores, minerals, and organic and inorganic materials is one of the greatest commercial importance, and often is the main manufacturing step in the preparation of these materials for the market. Electrostatic methods have heretofore proven useful in efficiently carrying out many separations that would be otherwise difficult or impractical to accomplish on a commercial scale. For example, electrostatic separators have been used to separate slate from coal, to classify the mineral components of cements, to remove foreign matter from grain, and for many other uses.

I have found, however, that when separating fibers or laminar materials from closely associated granular materials that the efficiency of recovery may be greatly increased by the use of a new and different treatment, either in combination with the known and conventional treatment heretofore employed in the art, or as a substitute for certain steps thereof, as will be hereinafter more fully disclosed.

This new treatment may be broadly described as the simultaneous treatment of the materials to be separated by electrostatic and pneumatic forces, and the subsequent electrostatic treatment of the removed material in air suspension. I have found that such treatment is not only more efficient in separating such materials, but will also facilitate the work of subsequent cleaning and classifying units, and, serves in some cases to eliminate their need altogether depending on the nature of the materials, the preliminary treatment and the like.

It is well known that certain materials are more susceptible to electrostatic forces, and particularly to charges of certain polarity than are others, as has been disclosed in my earlier patents, Nos. 2,197,864, and 2,197,865. If the polarities are so selected that granular materials are depressed, and the laminar or fiberous materials are drawn forth by the electrostatic field, in cooperation with simultaneously applied pneumatic forces, a greater efficiency of separation may be obtained. It is therefore an object of this invention to combine electrostatic and pneumatic forces in the most efficient manner for the separation of materials as described above.

One of the most difficult separations of this class to accomplish is the separation of asbestos fibers from asbestos rock. Asbestos is found in its natural state intimately mixed and intertwined with a compressed conglomerate mass of other minerals which compose the asbestos rock. In order to recover the asbestos in commercially usable form, it is necessary to extract the fibers from the rock, and to unfold, separate, and open them, and to remove all adhering foreign matter.

The conventional method of recovery of asbestos is to progressively crush the asbestos rock into smaller pieces, and to remove the exposed fibers between successive crushing steps by passing the rock particles, in a thin stream, over vibrating or shaking screens through which a current of air is forced, the air removing the loose fibers from the freshly crushed rock. Other mechanical devices are also in general use to loosen the fibers from the rock, the most common being "fiberizers" or beaters, which subject the rock to a violent hammering or beating action, thus further loosening the fibers from the adhering waste material and from each other. Each of these beating steps is usually followed by their passage across an air lift screen, as described above, to remove the free fibers.

This method of recovery is cumbersome and expensive in practice, requiring much heavy equipment and the consumption of a large amount of power. In addition, the rough mechanical treatment of the rock entailed by the crushing and beating steps breaks and impairs the value of a large proportion of the asbestos fibers existing in the original rock, while the prior steps for separating the loosened fibers have proven wasteful of the short fibers, so as to be inefficient and uneconomical.

It has been found that the shortcomings of the conventional processes are practically overcome by combining an electrostatic separation step with the crushing and beating steps and thereby extracting and recovering a substantially larger proportion of the fibers without damage, as disclosed in the copending patent application Serial No. 394,069, filed by me jointly with Charles G. Boss, November 24, 1953. While the process and apparatus of the above application constitute definite improvements over the conventional process and apparatus, it has been found that the electrostatic treatment was not as efficient as desired in removing the fibers, and particularly those of short length, without excessive repetition of the electrode treatments. A further disadvantage of this electrostatic separation process is the tendency of the fibers to build up and bridge between the charged electrodes and the grounded chutes or divider points. These flocculated masses of fibers provided paths for an appreciable leakage of the electrostatic charge, thereby causing a drop in potential, a loss of power, and a lowering of efficiency of the separation.

I have found, however, that these disadvantages may be overcome and the efficiency of recovery may be greatly increased at much lower cost by the use of my new process comprising the simultaneous application of electrostatic and pneumatic forces as described above, and that such treatment is not only more efficient in extracting asbestos fibers from the crushed particles of rock, but will serve is some cases to eliminate entirely the necessity of subsequent beating or fiberizing steps, and will thus yield a product of greatly improved quality.

In addition, I find that by the use of this method I am able to recover a much larger proportion of the asbestos content of the rock with fewer electrodes, and to produce a fiber concentrate that is substantially free from particles of gangue, and in a condition ready for sizing for commercial use without any additional cleaning or fiberizing steps.

A further advantage is that a larger proportion of the fibers are opened up and recovered in an undamaged state by the cooperating electrostatic and pneumatic effects than was heretofore the case when the fibers had to be passed through a plurality of beaters or fiberizers.

I have also found that the efficiency of this method of asbestos recovery is not adversely affected by atmospheric changes, such as variations in humidity, which has heretofore proved detrimental to conventional air separation methods. For this reason, I am able to achieve a uniformly high degree of efficiency and recovery.

Accordingly, it is another object of this invention to provide an improved method for the recovery of asbestos from its ores by a mode of treatment involving the simultaneous application of electrostatic and pneumatic effects.

Another object is to provide a method of the above description that may be readily and economically employed, and is simple, reliable, and efficient in operation.

A further object is to provide an improved apparatus for carrying out the above method of asbestos recovery.

To these and other ends the invention resides in certain improvements and combinations of parts and method steps, all as will be hereinafter more fully described, the novel features being pointed out in the claims at the end of the specification.

In the drawings:

Fig. 7 is a schematic flow sheet of an asbestos recovery plant using a modified method.

Figure 6:
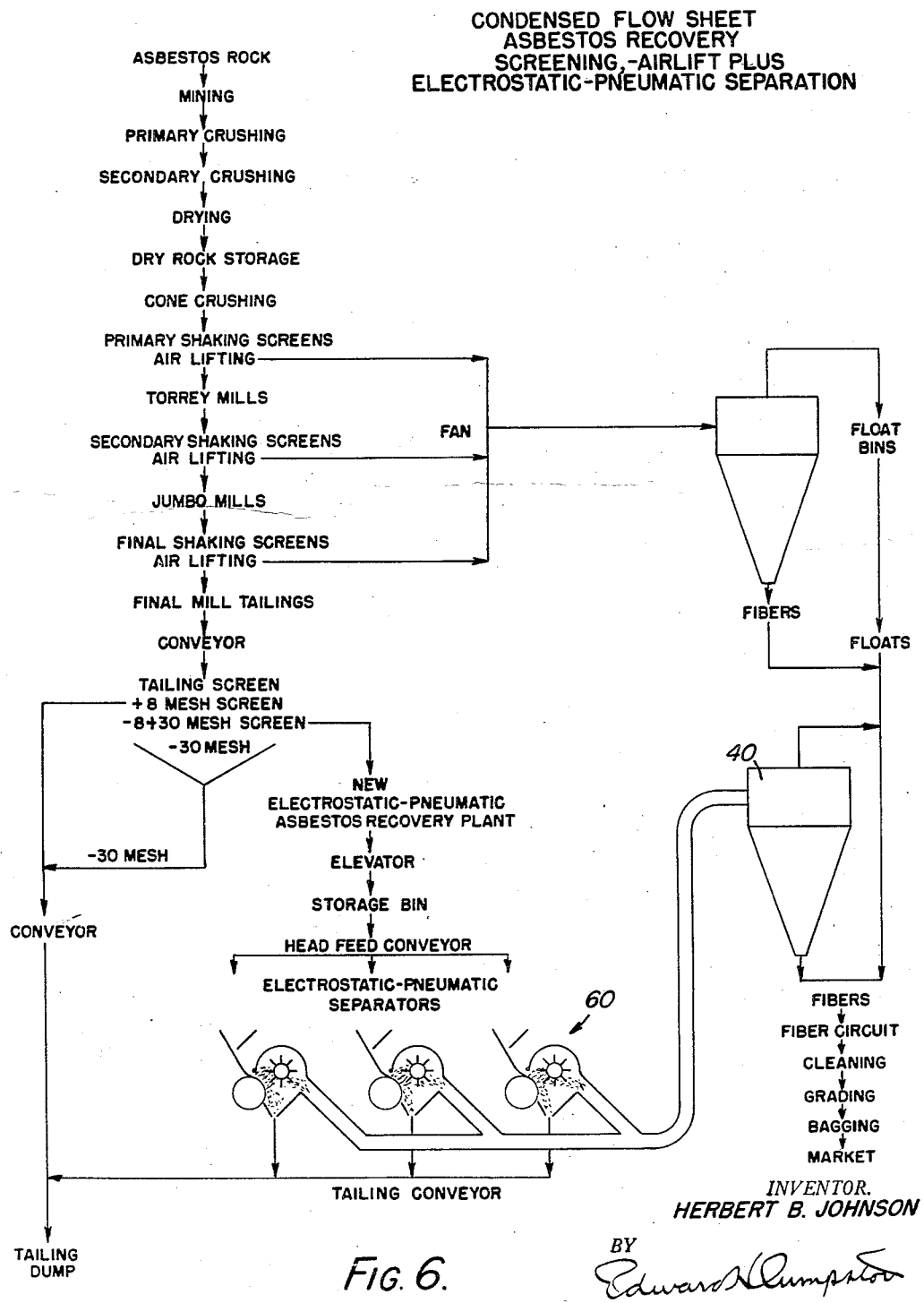
Fig. 6 is a schematic flow sheet of a conventional asbestos recovery process wherein the tailings are treated by a method embodying this invention.

My improved method is best disclosed in connection with an apparatus for carrying it out. As an example, I will describe an apparatus adapted to treat the tailings from a conventional asbestos recovery mill, as illustrated in Fig. 6, but it is to be understood that by varying the details of design within the scope of this invention, my method may be advantageously applied at any stage of the asbestos recovery process. Such apparatus, disclosed by way of illustration, preferably comprises a feed bin or hopper 10 (Fig. 1) of known design for holding the crushed asbestos rock 11, which in this case comprises a portion of the discharge or tailings from a conventional asbestos mill. These tailings generally consist of particles ranging in size from 8 to 30 mesh, but may vary considerably, depending on the character of the prior treatment.

Figure 1:
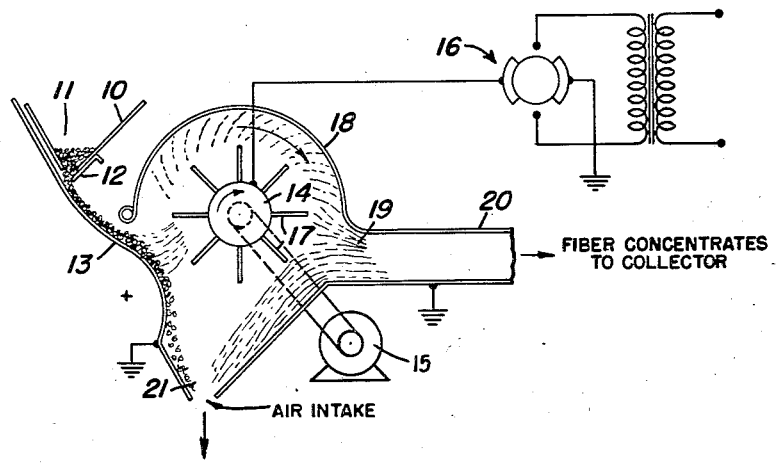
Fig. 1 is a schematic sectional side elevation of an electrostatic separator embodying this invention.

The particles of rock are fed in a thin continuous stream from hopper 10 by an adjustable feeding device such as the gate indicated at 12 in Fig. 1, to the top surface of a chute-like grounded sheet metal electrode 13, the upper portion of which is sloped downwardly to cause the rock particles to slide freely. The lower end of electrode 13 is formed into an outwardly projecting curve of substantially circular cross section whose lower extremity is curved inwardly, to form a projecting nose portion. A second electrode 14, in the form of a rotating drum is mounted in insulated bearings adjacent to and parallel to the surface of the nose portion of electrode 13, and is connected to the negative terminal of a suitable high potential electrostatic source supplying an unidirectional potential of between 16,000 and 20,000 volts, such as is described in the patent to Johnson and Packer, No. 2,357,658, shown generally at 16. Because of the electrical characteristics of asbestos rock, it has been found more efficient to place a negative polarity on electrode 14, as a negative polarity is more effective in depressing the waste rock minerals and in attracting asbestos fibers, as described above.

Electrode 14 carries a plurality of sharp edged radical vanes 17 mounted on its periphery, and is rotated by some suitable means, such as an electric motor 15. A grounded metal shield 18, whose curved portion is substantially concentric with electrode 14 extends partially therearound as shown in Fig. 1. Shield 18 has an opening 19 which is connected to a suction duct 20, the function of which will hereinafter be disclosed.

The crushed particles of asbestos rock, which are fed to the upper surface of electrode 13, as described above, slide down the surface thereof and over the outwardly projecting nose portion which brings them into proximity to rotating electrode 14, and into the influence of the electrostatic field created by the negative charge on this electrode. This electrostatic field induces a positive charge on the particles or rock and the fibers clinging thereto. This charge tends to repel the particles from electrode 13 and attract them to electrode 14 and particularly to vanes 17 about which the electrostatic field is concentrated, as will be hereinafter more fully explained. Since the asbestos fibers are more conductive than the associated gangue or waste materials, the fibers are more strongly attracted to negatively charged electrode 14 than is the gangue. Consequently, the fibers are drawn out of the mass, and move away therefrom, towards electrode 14.

Since electrode 14 is rotated as explained above, the radial vanes 17 on electrode 14 function also as the blades of a centrifugal fan or blower, and set up a strong whirling mass of air, and also cause the movement of a somewhat weaker current of air through the passageway between electrode 14 and shield 18, through the opening 19 and out through duct 20. This air current sweeps over and through the traveling particles of rock, lifting and pulling at the exposed fibers and aiding the electrostatic force in removing same from the rock.

Vanes 17 also serve to concentrate the electrostatic field. As is well known, electrostatic forces are concentrated by sharp points and edges. Thus, there is an especially intense field portion adjacent to the end of each vane and especially between each vane and grounded electrode 13. As each vane passes electrode 13 and the stream of ore particles, there is a surge of strong electrostatic force acting on the fibers therein, which diminishes as the vane passes the electrode and moves away therefrom. This effect occurs every time a vane passes electrode 13, and thus the stream of ore particles and the fibers therein are subject to a fluctuating pulling or jerking action which is more effective than a steady pull in removing the entangled fibers from the rock.

After the fibers have been pulled away from the stream of ore particles, they are drawn into the fan-like electrode 14 by the air stream created thereby. The fibers are held in suspension by the electrostatic forces and the above described whirling current of air while traveling around shield 18, and travel around therewith. However, once the fibers touch negatively charged electrode 14, they lose their positive charge, acquired by induction as explained above, and acquire a negative charge by conduction with the electrode, and are repelled therefrom and attracted to grounded shield 18. They then move to the shield, where they again lose their charge by conduction and are once more attracted by electrode 14. This repeated charging and loss of charge causes the fibers to bounce rapidly back and forth from electrode 14 to shield 18, while being carried in a clockwise circular path by the air stream set up by the rotating vanes on the moving electrode. This rapid bouncing motion, and the pulling and tugging action of the electrostatic forces causing it, unfolds and open up the fibers of asbestos and separates them from each other and from any particles of sand or gangue clinging thereto, thereby effecting a fiberizing and cleaning action.

When the fibers reach opening 19 in the shield, they are drawn into the suction duct 20 by the air stream. However, as explained above, the air stream passing out through this duct is materially weaker than the strong whirling air stream set by the vanes on the rotating electrode, so that while the light, fluffy fibers are easily withdrawn, the particles of sand and gangue fall out of the air stream and into the tailings chute as indicated at 21 in Fig. 1.

The asbestos fibers which are drawn into duct 20 are collected by means of a cyclone separator 40, or other suitable device, as shown in Fig. 6. The tailings may be passed through a second electrostatic separator, or discarded, depending on the type and character of the rock being treated.

Figure 2:
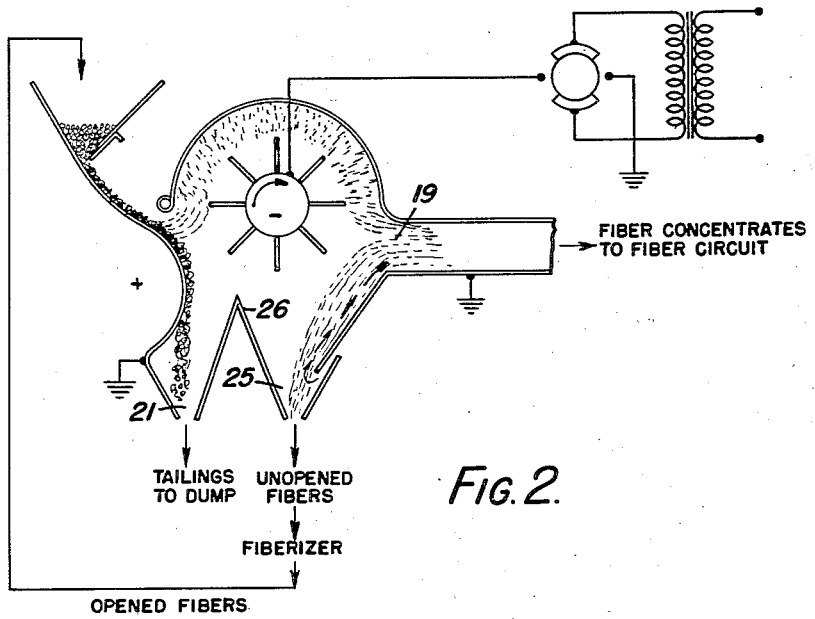
Fig. 2 is a schematic sectional side elevation of a modified embodiment of this invention.

It is very difficult to separate the individual fibers of asbestos found in certain types of rock since they are very tightly compressed into cohering bundles. Where rock of this character is being treated, it often happens that whole bundles of fibers are withdrawn from the rock, and are carried around shield 18 by the air stream without being completely separated or fiberized by the electrostatic forces and the bouncing action as described above. Such bundles or agglomerates of fibers are relatively dense and heavy compared to free fibers, and thus will not be drawn through opening 19 by the weak air stream passing therethrough, and fall down with the heavier particles of sand and gangue. In order to prevent the loss of these fibers, I have designed a second embodiment of my machine which is shown in Fig. 2, which is identical to the machine described above except for the addition of a second chute 25 separated from the tailing chute 21 by partition 26. Here the sand, gangue, and unopened bundles of fibers are collected and run through a beater or fiberizer to break up the agglomerate bundles of fibers. This beaten material is then recycled to the head feed of the separator, and the fibers are drawn out as described above.

I have found that when asbestos rock containing 4 to 12% asbestos is treated in this manner that 95 to 97% of the asbestos fibers are removed therefrom, yielding a concentrate which, after being screened on a 30 mesh screen, will be from 97 to 100% clean.

Rotary electrode 14 has been shown as having straight radially extending fins. However, I contemplate several modifications of this design, such as for example changing the inclination of the fins to the surface of the electrode to obtain the most efficient fan action to set up the rotary circulation of air described above. Further, the length of these vanes may be varied to suit the material being treated, as I have found that, for some materials a smooth, roughened, or knurled electrode will yield results almost as satisfactory as one with fins I have also found that, with asbestos rock, the best results are obtained with fins from 1/8 to 3/8 of an inch high, spaced from 7/8 to 1 1/8 inch from the shield, depending on the length of the fiber and the shape of the particles.

The most efficient rate of rotation of the electrode depends on the character of the material being separated. I have found that when treating asbestos rock, speeds from 200 to 800 R. P. M. are required to achieve electrically charged air suspension and independent action of the individual asbestos fibers and to avoid flocculation of masses of fiber in the space between the electrode and the grounded shield, and the consequent leakage of the electrostatic charge, and to keep electrode 14 clear. In general, the higher the asbestos content of the rock, the greater must be the electrode speed to prevent flocculation.

Figure 3:
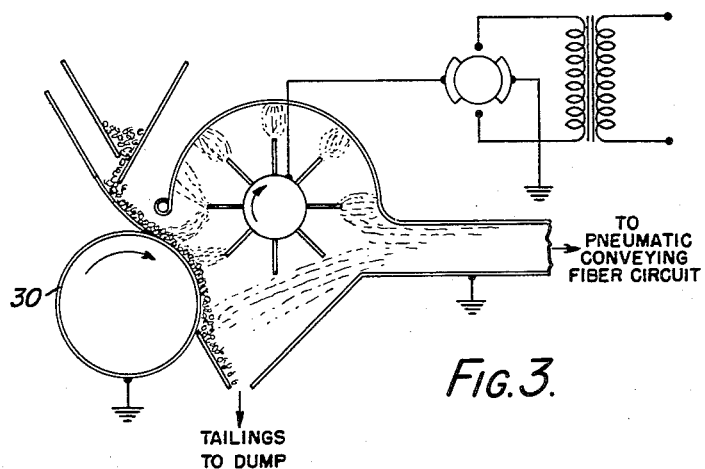
Fig. 3 is a schematic sectional side elevation of another modification.
Figure 4:
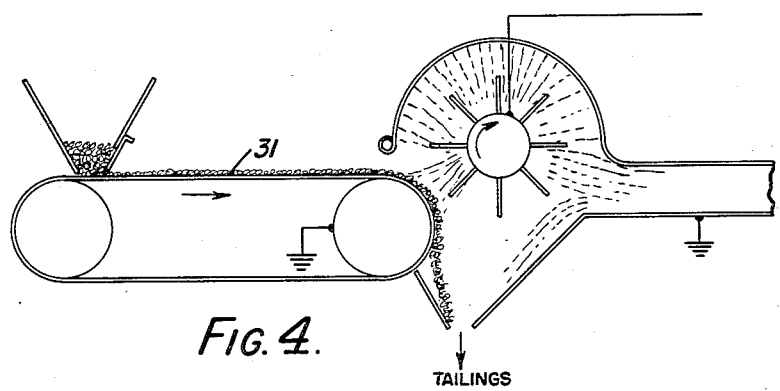
Fig. 4 is a schematic sectional side elevation of a further embodiment.

Although this invention has been described above as having a stationary inclined chute-like sheet metal electrode to transport the particles of material to be treated to the rotary electrode, any known or convenient means can be used. For example, in the embodiment shown in Fig. 3, a drum-like rotary electrode 30 is used; in the embodiment of Fig. 4 a conveyor belt 31 delivers the particles to the separator.

Figure 5:
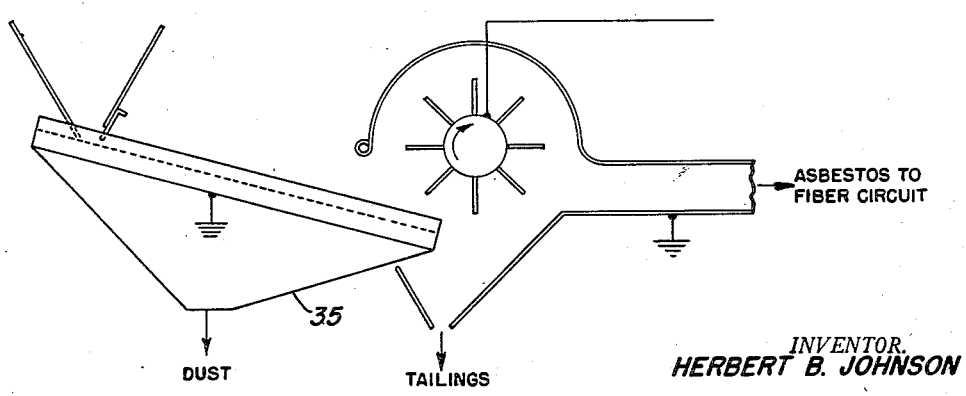
Fig. 5 is a schematic sectional side elevation of still a further embodiment.

In the embodiment shown in Fig. 5, an electrostatic separator is placed over the end of a conventional air lift screen 35, the latter serving as the grounded electrode and conveying means serving to move the material being treated into the separation zone. In this embodiment, the dust and undersize particles are first removed by falling through the screen, and then the fibers are drawn out of the remaining rock at the discharge end of the screen.

This embodiment may be used in any desired stage of existing asbestos mills, or the separator portion thereof may be attached to existing air lift screens, as desired. Where the latter course is followed, the efficiency of the air lift screen is greatly increased, and the consumption of air is reduced, as the electrostatic forces are more efficient and more selective in removing asbestos fibers from particles of rock than an air stream alone, because, as explained above in connection with the first embodiment of this invention, only a relatively weak current of air is required to draw the opened asbestos fibers into the suction duct once they have been opened and suspended in the rotating air stream set up by the rotating electrode.

This particular embodiment is also adapted for use as a substitute for most of the expensive and relative inefficient machinery now in use in orthodox asbestos recovery plants. I contemplate a complete asbestos recovery process substituting electrostatic separators at every stage of the process for the beaters or fiberizers and air lift screens conventionally used. Such a process is shown schematically in the flow sheet of Fig. 7.

Referring particularly to Fig. 7, my new recovery process comprises the orthodox preparatory steps of primary crushing and drying of the asbestos rock. The crushed rock is then fed to the upper surface of a vibrating or shaking screen 50 which allows the fine dust to fall through, and at the same time moves the rock under an electrostatic separator 51 such as that described above and shown in detail in Fig. 5. The separator draws out and fiberizes the exposed asbestos fibers and discharges same into suction duct 52. The large pieces of rock then fall off the lower end of screen 50 into a suitable crusher indicated at 53 in the figure. The crusher breaks the rock down and exposes fresh surfaces and releases more asbestos. The rock is fed onto the upper surfaces of a second screen 54 which in like manner, removes the dust and at the same time feeds the ore to a second separator 55 which draws more fibers into the duct 52. The remaining rock falls off the lower end of screens 54 into the Torrey mills which beat the rock particles to release more fibers, and the particles then fall onto the next screen below which screens out the dust and feeds the rock particles and fibers to separator 56, whence the released fibers are drawn pneumatically into duct 52. In this manner the ore is successively crushed, screened, and exposed to electrostatic and pneumatic forces for removing and fiberizing the asbestos contained therein. The finely crushed asbestos rock is fed to final screen 57 which differs from the above mentioned screens 50 and 54 in that it contains two superimposed screens, 58 and 59, of approximately 8 mesh and 30 mesh size respectively. The material remaining on the 8 mesh screen is fed to an electrostatic separator 60 in the manner described above, and after all exposed fiber has been removed is discarded to the tailings dump. The material passing through the 30 mesh screen is discarded and sent to the tailing dump. The material that passes through the 8 mesh screen but remains on the 30 mesh screen falls off the lower end of the latter and is conveyed to an electrostatic recovery unit such as that described in the first part of this application and indicated generally at 61 in Fig. 7.

The asbestos fibers that were drawn out by the electrostatic separators at the various stages described above and drawn into vacuum system 52 are separated from the air stream by a suitable device such as a cyclone separator indicated at 62. These fibers may be run through an electrostatic separator shown at 63 which serves to open and fiberize this material. Any conglomerate bunches of unopened fibers fall into the middling chute of separator 63 and are conveyed to a fiberizer or beater of known design such as, for example, the Willow Fiberizer which is widely used in the industry. These beaten fibers and associated particles of sand and gangue, by clinging thereto, may be directly returned to the head feed chute of electrostatic separators 63 and are again separated for fiber recovery. The sand and waste material pass to the tailings, but the open fibers are removed, and sent to a second duct which communicates with a second cyclone separator 64, the open fibers are then conveyed to the fiber circuit which comprises cleaning, grading and bagging machinery of known and conventional design and are then ready for the market. The very fine dust-like asbestos fibers (floats) that are not removed from the air stream from the cyclone separators 62 and 64 are conveyed to settling chambers and recovered.

The above system is adapted for use as a complete asbestos recovery plant, yielding very high percentage recovery of undamaged asbestos fibers. It is to be noted that the fiber is substantially unbeaten, as only those stubborn conglomerates of fiber which have resisted the fiberizing efforts of several electrostatic separators are subjected to beating. This results in much less breakage of fiber and therefore a higher percentage of longer fibers which command a premium price in the market.

It will thus be seen that my invention may be advantageously used for the recovery of asbestos either in combination with conventional asbestos mills, or as the principal recovery device in a newly designed mill as above described. Its usefulness, however, is not confined to the recovery of asbestos, as it may be advantageously adapted for the recovery of any laminar or fiberous material such as mica or graphite, the removal of leaf tobacco from the stems, and the like.

It will thus be seen that the invention accomplishes its objects and while it has been herein disclosed by reference to the details of preferred embodiments, it is to be understood that such disclosure is intended in an illustrative, rather than a limiting sense, as it is contemplated that various modifications in the construction and arrangement of the parts and method steps will readily occur to those skilled in the art, within the spirit of the invention and the scope of the appended claims.

I claim:

1. The method of separating a mixture of materials comprising the steps of feeding a thinly distributed stream of said mixture to a conveying electrode, subjecting said mixture on said conveying electrode to an electrostatic field between said conveying electrode and a spaced rotating electrode roll of opposite polarity while maintaining a high difference of electrical potential between said electrodes, for preferentially separating and attracting one component of said mixture toward said rotating electrode, confining the area around said rotating electrode to set up a whirling current of air, and pneumatically removing and collecting the separated component from said area.

2. The method of separating a mixture of materials comprising the steps of feeding a thinly distributed stream of said mixture to a conveying electrode, subjecting said mixture on said conveying electrode to a current of air and to an electrostatic field between said conveying electrode and a spaced rotating electrode roll of opposite polarity while maintaining a high difference of electrical potential between said electrodes, for preferentially separating and attracting one component of said mixture toward said rotating electrode, inducing a whirling stream of air around said rotating electrode, and pneumatically removing said separated component from said air stream.

3. The method of separating a mixture of materials comprising the steps of feeding a thinly distributed stream of said mixture to a conveying electrode, subjecting said mixture on said conveying electrode to a current of air and to an electrostatic field between said conveying electrode and a spaced rotating electrode roll of opposite polarity while maintaining a high difference of electrical potential between said electrodes, for preferentially separating and attracting one component of said mixture toward said rotating electrode, confining the area around said rotating electrode within an adjacent grounded surface to set up a whirling current of air, and causing the particles of said separated component to repeatedly oscillate between said rotating electrode and said adjacent grounded surface, thereby further separating said particles from impurities clinging thereto, and pneumatically removing and collecting said separated component from said whirling current of air.

4. An apparatus for separating a mixture of materials comprising a grounded conveying electrode, a rotary charged electrode spaced from said grounded electrode and having a surface of electrically conductive material, a grounded shield substantially enclosing said charged electrode in spaced relation therewith, means for rotating said rotary electrode to induce a whirling current of air within said shield, means for maintaining a high difference of electrical potential between said charged electrode and said grounded electrode and shield for preferentially attracting a component of said mixture to said charged electrode, and means pneumatically withdrawing said component from said whirling current of air.

5. An apparatus for separating a mixture of materials comprising a grounded conveying electrode, a rotary charged electrode spaced from said grounded electrode and provided with circumferentially spaced radial vanes, a grounded shield substantially enclosing said charged electrode in spaced relation therewith, means for rotating said charged electrode to induce a whirling current of air within said shield, means for maintaining a high difference of electrical potential between said charged electrode and said grounded electrode and shield for preferentially attracting a component of said mixture to said charged electrode, and means for pneumatically withdrawing said component from said whirling current of sair.

6. An apparatus for separating asbestos fibers from a mixture of crushed rock and fibers comprising a grounded conveying electrode, a rotary negatively charged electrode spaced from said grounded electrode and provided with circumferentially spaced radial vanes, a grounded shield substantially enclosing said negatively charged electrode in spaced relation therewith, means for rotating said rotary electrode to induce a whirling current of air within said shield, means for maintaining a high difference of electrical potential between said negatively charged electrode and said grounded electrode and shield for preferentially attracting said fibers to said charged electrode, and means for pneumatically drawing said fibers from said whirling current of air.

7. An apparatus as specified in claim 6 wherein said difference of electrical potential is between 16,000 and 20,000 volts.

References Cited in the file of this patent

UNITED STATES PATENTS

| | | |
|---|---|---|
| 1,153,182 | Schniewind | Sept. 7, 1915 |
| 1,549,875 | Hoone | Aug. 18, 1925 |
| 2,135,716 | Johnson | Nov. 8, 1938 |
| 2,197,864 | Johnson | Apr. 23, 1940 |
| 2,197,865 | Johnson | Apr. 23, 1940 |
| 2,317,210 | Masse | Apr. 20, 1943 |
| 2,357,658 | Johnson | Sept. 5, 1944 |
| 2,445,229 | Masse | July 13, 1948 |
| 2,559,076 | Johnson | July 3, 1951 |

UNITED STATES PATENT OFFICE
CERTIFICATE OF CORRECTION

Patent No. 2,839,189 June 17, 1958

Herbert B. Johnson

It is hereby certified that error appears in the printed specification of the above numbered patent requiring correction and that the said Letters Patent should read as corrected below.

Column 2, line 25, for "dsiclosed" read -- disclosed --; column 3, line 67, for "radical" read -- radial --; column 5, line 41, after "fins" insert a period; column 7, line 2, for "than" read -- then --; column 8, line 23, after "means" insert -- for --; line 37, for "sair" read -- air -- line 60, list of references cited, inventor's name, for "Hoone" read -- Horne --.

Signed and sealed this 12th day of August 1958.

(SEAL)
Attest:

KARL H. AXLINE
Attesting Officer

ROBERT C. WATSON
Commissioner of Patents